April 15, 1930.   A. D. WHIPPLE   1,754,660
VALVE CAP
Filed March 19, 1928
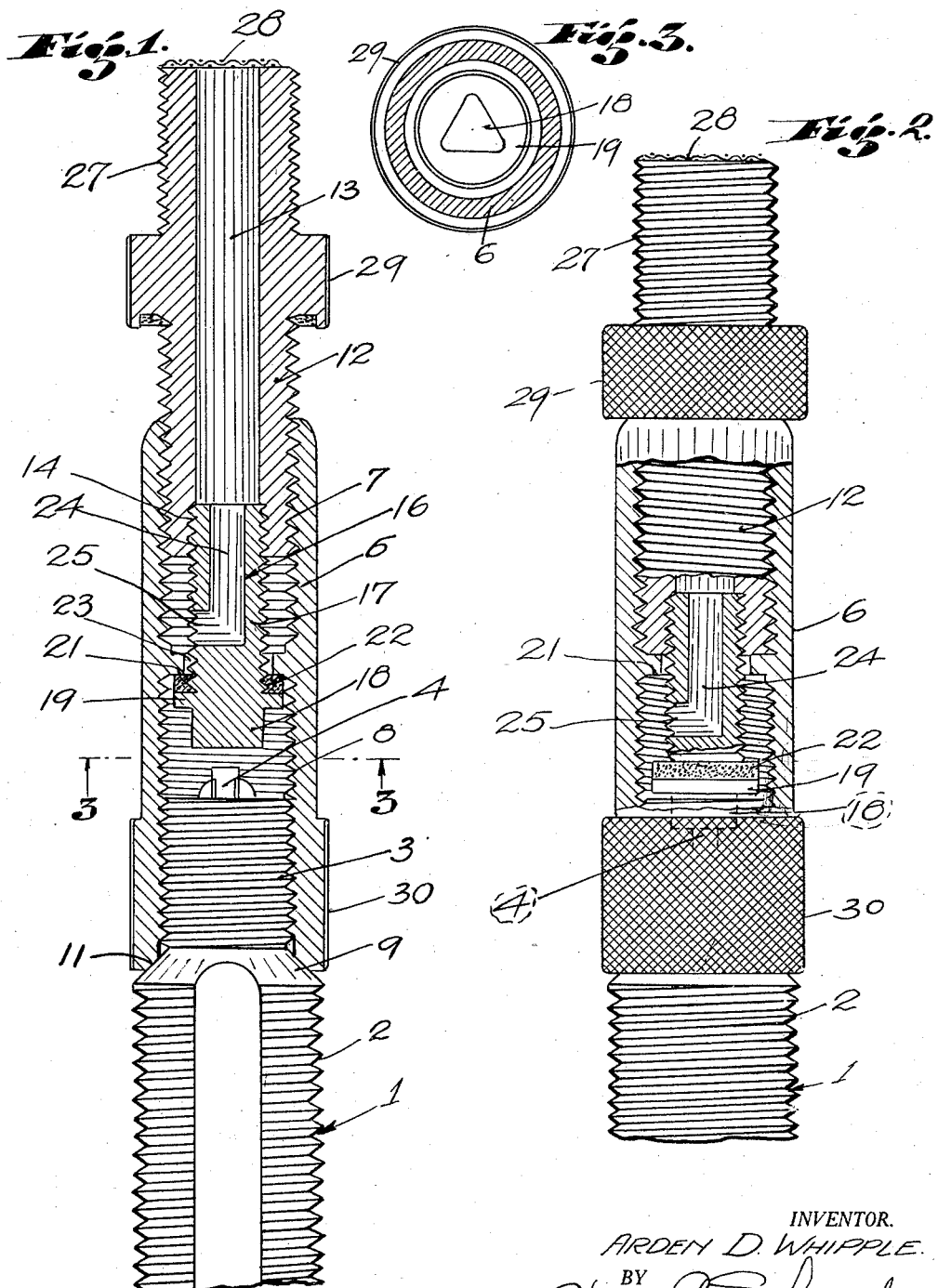
INVENTOR.
ARDEN D. WHIPPLE.
BY
Harry G. Schroeder
ATTORNEY Patented Apr. 15, 1930

1,754,660

UNITED STATES PATENT OFFICE

ARDEN D. WHIPPLE, OF OAKLAND, CALIFORNIA, ASSIGNOR TO CLARA M. HUTCHINSON, OF PIEDMONT, CALIFORNIA

VALVE CAP

Application filed March 19, 1928. Serial No. 262,795.

The invention forming the subject matter of this application relates to an improvement in caps adapted to be placed on the usual type of pneumatic tire valves, and it is particularly an improvement upon my valve cap forming the subject matter of my co-pending application, Serial Number 191,736, filed May 16, 1927.

The primary object of the invention is to provide a cap which functions to control the inlet and exhaust of the air from the tire without being removed from the tire to which it is applied.

A further object is to provide an improvement in a valve cap which is thoroughly dust-proof and airtight, and which may be readily attached to any standard valve stem such as now commonly employed.

Other objects of the invention together with the foregoing, will be set forth in the following description of the preferred embodiment of my invention.

It is to be understood I do not limit myself to the embodiment disclosed in said description as shown in the drawings as I may adopt variations of my preferred form to cover my invention as set forth in the claim.

The invention is illustrated in the drawings accompanying and forming part of the specification in which, Figure 1 shows a vertical view in which the usual tire valve stem is shown in elevation, while the valve cap is shown in vertical section as applied thereto, Figure 2 shows my valve cap applied to the usual tire valve cap, the valve cap being shown partly in section and in an open position, and Figure 3 is a sectional view taken on the lines of 3—3 of Figure 1.

In carrying out my invention I make use of a pneumatic tire valve of the usual type, denoted by the reference numeral 1, a lower threaded portion 2 of which is adapted to serve as a means for engagement for the usual valve cap and lock nut for securing the same in place; and the reduced upper threaded portion 3 thereon ordinarily provides means for engagement for the usual type of valve caps which this invention is designed to replace. The inner valve is disposed in the valve 1, a plunger 4 of the inner valve extends above the end of the threaded reduced portion 3. The inner valve is of the usual type and is held against the valve seat by a spring, the action of which may be overcome by pressure of the air used for inflation or by manually pressing the plunger 4 downwardly.

The reference character 6 indicates a cap sleeve which is interiorly threaded for portions of the sleeve at each end 7 and 8, the threaded portions being so cut that the portion 7 is threaded for a left hand thread while the portion 8 is threaded for receiving the reduced portion 3 of the main valve 1. The lower threaded portion 2 and the upper threaded portion 3 of the main valve 1 are separated by a conical shoulder 9 and the corresponding end 11 of the sleeve 6 is so tapered that it may be placed in abutting relation with said shoulder thus forming an additional air sealing means whereby any small portion of air escaping from the tire through the tire valve and finding its way past the threaded connection between the tire valve and the sleeve will be held by the seal made between the edge of the sleeve and the shoulder upon which it rests.

A cylindrical housing 12 is provided with a centrally disposed passage 13 which extends from the outside end of the cylindrical housing 12. At the inside end of the passage 13 the housing is provided with thread 14 into which is secured a correspondingly threaded valve controlling member 16. The valve controlling member consists of a threaded stem 17 which is in engagement with the left hand thread 7 of the cylindrical housing 12 and a head 18 which head is provided with a disk like valve body 19. A valve seat 21 is fixed in the sleeve between the upper and lower threaded portion. On the face of the disk like valve body 19, adjacent to the valve seat 21 is a compressible packing ring 22 for forming a more effective seal between the valve seat and the valve body. An opening 23 in the valve seat 21 is completely sealed when the compressible packing ring 22 is pressed against the valve seat 21. The controlling member 16 is provided along a portion of the length thereof with the central bore or passage way 24, and an opening 25 establishes communication between the central bore and the outside of the chamber formed in the sleeve 6.

The valve controlling member 16 is firmly threaded into the threaded hole 14 of the cylindrical housing 12 so that it moves therewith. When the cylindrical housing 12 is unscrewed from the threaded hole 7 it raises the valve body 19 so that the compressible packing ring 22 is firmly pressed against the valve seat 21 thereby completely sealing the opening 22. When the tire is to be inflated the cylindrical housing 12 is screwed down into the threaded hole 7 thereby separating the packing ring 22 from the valve seat 21, but it is not screwed down far enough to engage the valve plunger 4. The outside periphery of the upper end of the cylindrical housing 12 is threaded as at 27 so that a standard hand pump may be attached thereto, but the pump or compressed air line may also be attached in the customary way to the opening 13. A screen 28 is attached at the outside end of the cylindrical housing 12 so as to protect the passage ways 13 and 24 and the working parts of the cap from impurities that may pass in with the air. When the disk 19 is lowered in the aforesaid manner and the compressed air line is attached above the screen 28 then when the air is passed from the pump or from the compressor through the passage 13, the passage way 24 and the opening 25, it will pass through the opening 23 and the air pressure in the chamber of the sleeve will force the valve plunger 4 downwardly into an open position in the customary manner thus permitting the inflating of the tire.

If it is desired to release the air from the tire then the housing 12 is screwed into the sleeve 6 far enough to bring the controlling head 18 in engagement with the valve plunger 4 so that the valve plunger is pressed downwardly thereby opening the inner valve. The air from the tire is thus permitted to pass through the inner valve into the chamber of the sleeve 6 through the openings 23 and 25 and through the passage ways 24 and 13 out into the atmosphere.

In order to facilitate the turning of the cylindrical casing 12 in the sleeve 6 and the threading of the sleeve 6 upon the end 3 of the head 1, the housing 12 and the sleeve 6 are knurled on part of the surface as at 29 and 30 respectively. It will be noted that in my present device the manual depression of an inner valve shown in my previous invention is eliminated and the air is permitted to pass through the passage way of the cylindrical housing 12 directly to the atmosphere. When the housing 12 is screwed into the sleeve 6 far enough to bring the controlling body 18 into engagement with the valve plunger 4 the opening 25 is disposed at a point below the valve seat 21 in the relative position shown in Figure 2, thus the air escaping from the valve immediately enters the opening 25 and the passage 24.

In order to facilitate the removal of the controlling member 16 from the cylindrical housing 12 the head 18 is made of a triangular or any other polygonal cross section so that it may be readily gripped by a wrench or the like when the head 18 is unscrewed from said cylindrical housing.

Having thus described my invention what I now claim as novel and desire to secure by Letters Patent is:

A valve cap comprising a sleeve having an internally left hand screw thread at its outer end and an internally right hand screw thread at its inner end, a nipple in screw-threaded engagement with the outer end of the sleeve, a plug having an axial bore and a communicating transverse bore in screw-threaded engagement with the nipple, an annular flange carried by the plug and spaced from the transverse bore and an annular flange internally of the sleeve and intermediate the screw-threaded portions for cooperation with the flange of the plug to form a seal.

In testimony whereof I affix my signature.

ARDEN D. WHIPPLE.